United States Patent [19]

Thies et al.

[11] Patent Number: 4,946,541
[45] Date of Patent: Aug. 7, 1990

[54] PRESS FOR FORMING AN ENDLESS CONVEYOR BELT AND FOR REPAIRING A CONVEYOR BELT

[75] Inventors: Peter Thies, Ennepetal; Harald Fudickar, Solingen-Gräfrath, both of Fed. Rep. of Germany

[73] Assignee: C. S. Fudickar KG, Wuppertal, Fed. Rep. of Germany

[21] Appl. No.: 277,560

[22] Filed: Nov. 29, 1988

[30] Foreign Application Priority Data

Dec. 16, 1987 [DE] Fed. Rep. of Germany ....... 3742650

[51] Int. Cl.$^5$ .............................................. B30B 15/06
[52] U.S. Cl. ................................ 156/580; 100/258 A; 100/269 A; 156/583.1; 425/421; 425/456
[58] Field of Search ............. 425/421, 456; 100/93 P, 100/258 A, 269 A; 156/73.6, 583.1, 580; 264/69, 70, 71

[56] References Cited

U.S. PATENT DOCUMENTS

| 2,626,430 | 1/1953 | Dawson | 264/23 |
| 3,153,834 | 10/1964 | Boyer et al. | 425/421 |
| 4,235,580 | 11/1980 | Springs et al. | 425/456 |
| 4,388,860 | 6/1983 | Thies | 156/583.1 |
| 4,393,766 | 7/1983 | Thies | 100/93 P |
| 4,398,991 | 8/1983 | Thies | 156/583.1 |
| 4,423,674 | 1/1984 | Thies | 100/93 P |
| 4,548,771 | 10/1985 | Senapati et al. | 264/23 |
| 4,554,043 | 11/1985 | Fudickar et al. | 156/583.1 |
| 4,557,791 | 12/1985 | Fudickar et al. | 156/583.1 |
| 4,609,100 | 9/1986 | Fudickar et al. | 100/269 A |

FOREIGN PATENT DOCUMENTS

| 2055457 | 2/1970 | Fed. Rep. of Germany | |
| 0139809 | 1/1980 | Fed. Rep. of Germany | 264/69 |
| 3028400 | 9/1982 | Fed. Rep. of Germany | |
| 0252154 | 2/1970 | U.S.S.R. | 425/421 |
| 0634947 | 11/1978 | U.S.S.R. | 264/69 |

Primary Examiner—Merrell C. Cashion, Jr.
Assistant Examiner—Steven D. Maki
Attorney, Agent, or Firm—Herbert Dubno; Andrew Wilford

[57] ABSTRACT

The apparatus for forming an endless conveyor belt and for repair of a conveyor belt comprises at least one heatable press platen, a plurality of upper crossbars, a plurality of lower crossbars combined with the upper crossbar, a hydraulic press-pressure-producing mechanism supported on the crossbars having a plurality of adjacent hydraulic tubes of a constant circumference which are supported on one side on a press plate resting on one press platen spaceable relative to a crossbar and on the other side on the crossbar and at least one beam extending in the longitudinal direction of the conveyor belt combining the upper crossbars, at least one vibration generator directly or indirectly connected to one of the press platens on a protruding portion of that platen extending beyond the crossbars, a bending line compensator positioned adjacent to the press platen on which the vibration generator is connected maintaining the press platen substantially planar and at least one other vibration generator provided on the beam. The vibration generators may be mechanical or electromagnetic vibrators.

10 Claims, 2 Drawing Sheets

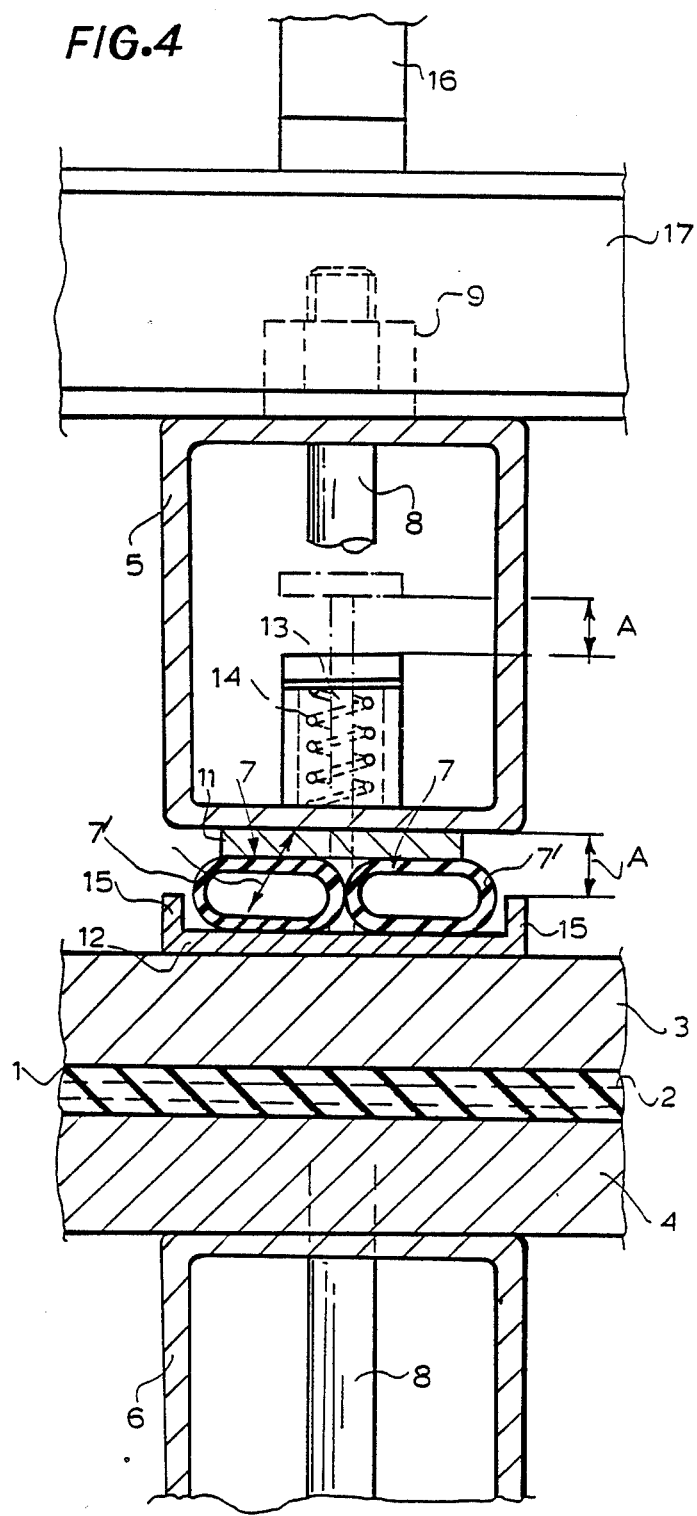

PRESS FOR FORMING AN ENDLESS CONVEYOR BELT AND FOR REPAIRING A CONVEYOR BELT

SPECIFICATION

1. Field of the Invention

Our present invention relates to an apparatus for transforming a strip into an endless conveyor belt and for the repair of a conveyor belt.

2. Background of the Invention

An endless conveyor belt can be formed from a conveyor belt strip and a conveyor belt can be repaired by an apparatus which comprises a plurality of heatable press platens, a plurality of upper crossbars, a plurality of lower crossbars and a hydraulic press-pressure-producing mechanism. The crossbars are combined pairwise by a plurality of clamping bolts and the press-pressure-producing mechanism is supported on the crossbars.

The press-pressure-producing mechanism has a plurality of hydraulic cushions deformable in cross section, normally in the form of a plurality of hydraulic tubes positioned adjacent one another and having a constant circumference, which are supported on one side on a press plate resting on one of the press platens spaced relative to one of the crossbars and on the other side on the crossbar. Generally the conveyor belt has stress bearing inserts also.

In making an endless conveyor belt or in the repair of a conveyor belt the process uses special vulcanization steps in which a conveyor belt section provided with rubber material prepared for vulcanization is brought between heated press platens and is vulcanized using pressure and heat.

The rubber has Newtonian flow viscosity properties and is subjected to flow under hot pressing. By "rubber" we mean either natural rubber or synthetic rubber but we also include plastic material. In the vulcanization of conveyor belts a flow-reducing hot pressing of the conveyor belt under pressure is required so that the rubber mixture to be vulcanized fills all the hollow spaces in the conveyor belt section to be vulcanized and the enclosed air and steam from the moisture in the materials used can escape.

Pressure and temperature are appropriately set. The temperature is for example in the vicinity of about 150° C. In the vulcanization of rubber various vulcanization stages can be distinguished depending on the vulcanization time. In fact the vulcanization is a cross-linking reaction in which the macromolecules of rubber are combined with one another by cross-linkages. In the unvulcanized state the rubber molecules are not fixed in position relative to one another and can move more or less freely relative to one another. The rubber is plastically deformable particularly in a heated environment. It has a mechanical and thermodynamically irreversible Newtonian flow.

In the known techniques over which our invention is an improvement, in the vulcanization the conveyor belt section is exposed to a static pressure between press platens which are moveable to and from the conveyor belt but otherwise fixed and which act perpendicularly to the plane of the conveyor belt section and for a sufficiently long duration.

To guarantee that all hollow spaces are filled satisfactorily one needs a pressure in the range between 10 to 15 bar and correspondingly heavy presses. That is troublesome particularly in regard to a press which is used for forming an endless conveyor belt, e.g. in a mine for coal, lignite, ore, gravel and the like. For a vulcanization in which a hot pressing is not required because of chemical phenomena substantially reduced pressure can be used, e.g. a pressure between 3 and 5 bars more or less.

In the known apparatus which is used in practice the press plates are provided with mechanical guides which prevent motion in the platen plane. Although the hydraulic cushions would allow mounting of a press platen so that it could vibrate, the press platens will not vibrate in the vulcanization process. They are not connected to a vibration generator. They must therefore operate with a comparatively high press pressure and thus vulcanization pressure so that in vulcanization all the hollow spaces are satisfactorily filled and the air and/or the steam or water vapor will escape.

OBJECTS OF THE INVENTION

The principal object of the invention is to provide a press which overcomes the aforedescribed drawbacks.

It is an object of the invention to provide an improved apparatus for forming an endless conveyor belt and/or repairing a conveyor belt in which the press pressure or the vulcanization pressure can be substantially reduced while ensuring satisfactory vulcanization and that so all hollow spaces are satisfactorily filled and air and water vapor can escape.

SUMMARY OF THE INVENTION

According to our invention at least one press platen is mounted by hydraulic cushions so that it can be vibrated and is connected to at least one vibration generator directly or indirectly.

The vibration generator operates in the vulcanization in connection with the formation of an endless conveyor belt or in repair of a conveyor belt. The vibrations are generated in the conveyor belt section on which the vulcanization is performed.

The vibrational motion can run orthogonal to the plane of the conveyor belt section or in the plane of the conveyor belt section.

The vibrational motion can be the result of superposition of motions in both those directions. The frequency is selected so that it is small in comparison to the pressing time and thus the vulcanization time. The amplitude of the vibrational motion can thus be in the millimeter range but it can also be smaller than a millimeter.

With the apparatus according to our invention advantageously in addition to the static press pressure from the vibrational motion also there is a dynamic press pressure effect on the conveyor belt section to be vulcanized which influences the flow behavior of the rubber beneficially so that with a comparatively small static pressure a satisfactory vulcanization is attained and all the hollow spaces are filled while moreover the escape of air and moisture is facilitated.

The press pressure, which must be applied by the press-pressure-producing mechanism, is reduced to about 5 bar and less. The vibration generator must only operate when the rubber has reached a sufficiently Newtonian flow. It is only switched on at this time so that the apparatus according to our invention saves energy.

In one embodiment the press platen to which the vibration generator is connected is maintained sufficiently planar by a bending line compensator. In this way during the vulcanization and the molding process the flowing rubber does not flow out uncontrollably from the region between the press platens. Suitable bending line compensators are known (see German Patent No. 30 28 400).

To provide vibrational motion in a press platen and thus in a conveyor belt section to be vulcanized, we provide that the upper crossbars are combined by at least one beam extending in the longitudinal direction of the conveyor belt and at least one vibration generator is mounted on the beam.

One can however directly introduce the vibrational motion into a press platen.

Furthermore at least one of the press platens can protrude in the conveyor belt longitudinal direction beyond the crossbars with a protruding portion and the vibration generator is connected to this protruding portion. In the embodiment in which both press platens are directly or indirectly connected to a vibration generator, the vibration generators should operate out-of-phase.

The frequency and/or amplitude of the vibration generator(s) are appropriately adjusted so that the apparatus according to our invention can be adjusted with to the vibrational motion for different operating conditions and different working materials.

The vibration generator can be constructed as a mechanical generator. The vibration generator can be an electromagnetic vibrator, e.g. a piezoelectric or magnetostrictive vibrator. The vibration generator may operate on the hydraulic pressure means for the press-pressure-producing mechanism. Furthermore it can be constructed as a hydraulic pulsator.

BRIEF DESCRIPTION OF THE DRAWING

The above and other objects, features and advantages of our invention will become more readily apparent from the following description, reference being made to the accompanying highly diagrammatic drawing in which:

FIG. 4 is a cross sectional view taken along the section line IV—IV of FIG. 2 seen in the direction of the arrows and enlarged still further by comparison to FIG. 2.

SPECIFIC DESCRIPTION

Figure 1:
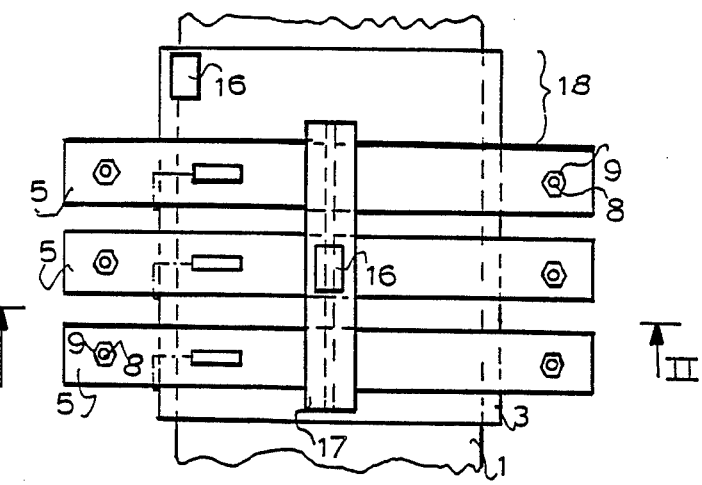
FIG. 1 is a top plan view of an apparatus for forming an endless conveyor belt and/or for repairing a conveyor belt according to our invention.

The apparatus shown in the drawing repairs and/or forms an endless conveyor belt 1 made of rubber or plastic which generally has a plurality of reinforcing inserts 2. This apparatus basically has the following basic structure:
heatable press platens 3,4,
a plurality of upper crossbars 5,
a plurality of lower crossbars 6, and
a hydraulic press-pressure-producing mechanism 7.

Figure 2:
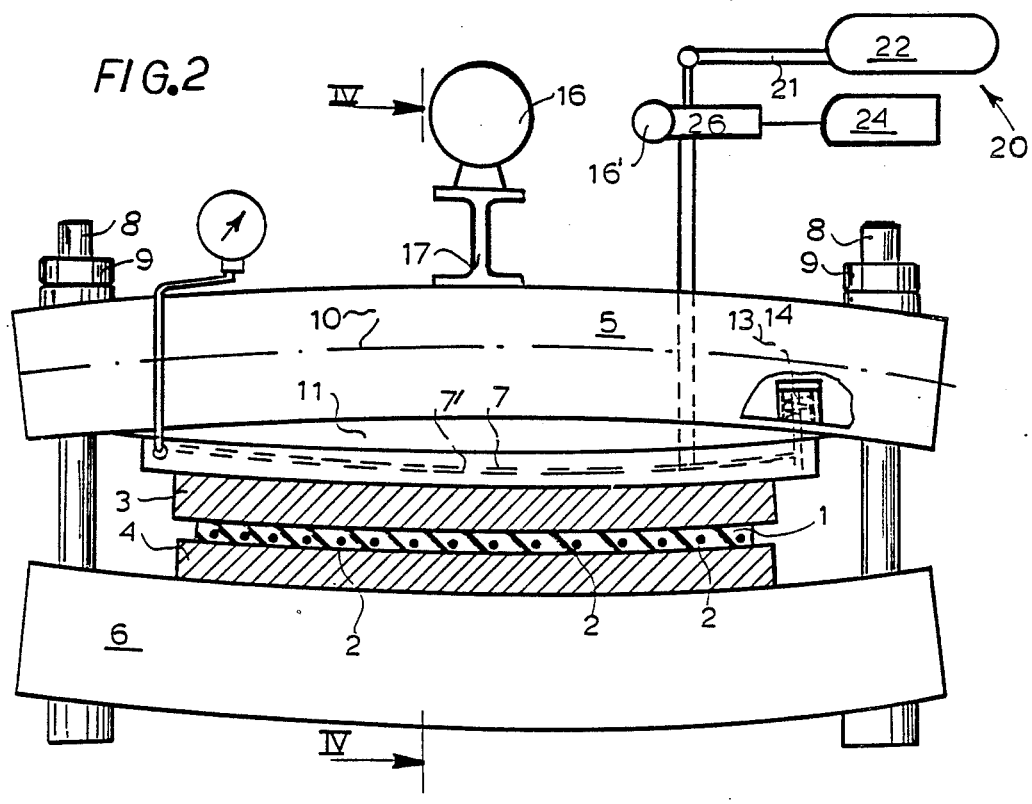
FIG. 2 is a detailed cross sectional view taken along the section line II—II of FIG. 1 shown enlarged in comparison to FIG. 1.
Figure 3:
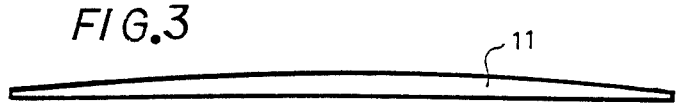
FIG. 3 is a cross sectional view of a bending line compensator for the apparatus shown in FIG. 2.

The crossbars 5, 6 are combined pairwise by clamping bolts 8 which can be threaded bolts with mechanical clamping members which can be nuts 9 mounted thereon. The crossbars 5, 6 experience a bending deformation with a definite bending line 10 when subjected to a predetermined press pressure. They are bendable according to weight. In this example the press-pressure-producing mechanism 7 acts between the upper press platen 3 and the upper crossbar 5. In FIG. 2 this deformation has been shown highly exaggerated. Accordingly the bending line compensator 11 shown in FIG. 3 was similarly exaggerated in regard to its upper curved edge surface.

The press-pressure-producing mechanism 7 has a plurality of hydraulic tubes 7' which are deformable in their cross sectional area but have a constant circumference. These hydraulic tubes 7' are supported directly or indirectly on associated crossbars 5 on one side and on the other side directly or indirectly on a respective press plate 12 which rests on a press platen 3 whose maximum spacing A from the associated crossbar 5 is limited.

To set the maximum spacing A suitable spacing bolts 13 are attached to the press plates 12. These spacing bolts 13 are guided in the crossbar 5.

Each of these spacing bolts 13 can be provided with a restoring spring 14.

The press plate 12 itself has lateral flanges 15 so that the hydraulic tubes 7 are housed as it were on the press plate 12.

The restoring springs 14 act then to press these lateral flanges 15 against the bottom side of the crossbar 5 so that the unit is closed especially in assembly and transport.

The design is such that the hydraulic tube 7 is nearly circular in the undeformed state having a diameter D that is larger than the abovementioned maximum spacing A.

Finally the hydraulic tubes 7' can have a substantially oval cross section surface in operation under pressure and can be supported with broad outer surfaces on the crossbar 5 and/or the press plate 12. The upper press platen 3 is mounted so it can vibrate or oscillate, being carried by the hydraulic cushion, namely the hydraulic tube 7 with suitable play. This press platen 3 is connected directly or indirectly to at least one vibration generator 16.

This this press platen 3 is maintained sufficiently planar by the bending line compensator 11.

A comparison of FIGS. 1 and 2 shows the upper crossbars 5 are interconnected by a beam 17 running in the longitudinal direction of the conveyor belt 1 and the vibration generator 16 is mounted on the beam 17. The beam 17 is also visible in FIG. 4. From FIG. 1 it can be seen further that the press platens 3, 4 protrude in the longitudinal direction of the conveyor belt beyond the crossbars 5, 6 on one side with a considerable projecting portion 18 and also a vibration generator 16 is connected to this projecting portion 18.

Generally the vibrations are generated either in the crossbar 5 or in one or more of the press platens 3, 4.

However, both alternatives are possible as is indicated in FIG. 1. If each press platen 3 and 4 is connected to a respective vibration generator 16, the vibration generators are driven out-of-phase. The frequency and/or the amplitude of the vibration generator 16 can be adjustable. The vibration generator 16 can be a mechanical vibrator or an electromagnetic vibrator such as a piezoelectric vibrator or a magnetostrictive vibrator. If one works with a mechanical vibrator the amplitudes of vibration are such that they amount to a few millimeters. If one works with an electromagnetic vibrator, one can operate with a substantially smaller amplitude.

A vibration generator 16' can alternatively act on the hydraulic pressurizing means 20 shown in FIG. 2 for the hydraulic tubes 7'. Advantageously this vibration generator 16' can be a hydraulic pulsator. The hydraulic pressurizing means 20 includes a reservoir 22 for hydraulic fluid, a piston-cylinder unit 26 and a motor 24 as well as a hydraulic line 21.

We claim:

1. A press for forming an endless conveyor belt and for repairing a conveyor belt, the press comprising:
   upper and lower heatable press platens;
   a plurality of pairs of lower transversely extending crossbars below the press platens;
   respective upper transversely extending crossbars above the upper press platen each directly above a respective lower crossbar;
   respective upper press plates arranged between the upper crossbars and the upper platen;
   at least one longitudinally extending beam fixed to the upper crossbars;
   means for pressing the respective plates downward and thereby vertically compressing a conveyor belt engaged between the platens, the means including respective transversely extending hydraulic tubes of uniform section positioned adjacent one another and each engaging downward against the upper press platen via the respective upper plate and upward against the upper crossbars; and
   two vibratory motion-inducing generators mounted respectively on the longitudinal beam and on one of the platens and operable to vibrate same.

2. The improvement defined in claim 1 wherein the upper press platen is maintained sufficiently planar by a bending line compensator.

3. In an apparatus according to claim 1, wherein each of the press plate is connected to a respective such vibration generator, the vibration generators being driven out-of-phase.

4. The improvement defined in claim 1 wherein the frequency and/or the amplitude of said vibration generators are adjustable.

5. The improvement defined in claim 1 wherein at least one of said vibration generators comprises a mechanical vibrator.

6. The improvement according to claim 1 wherein at least one of said vibration generators comprises an electromagnetic vibrator.

7. The improvement according to claim 6 wherein said electromagnetic vibrator is piezoelectric or magnetostrictive.

8. The improvement according to claim 1 wherein one of said vibration generators acts on a hydraulic pressurizing means of said means for pressing.

9. The improvement according to claim 8 in which said vibration generator comprises a hydraulic pulsator.

10. An apparatus for forming an endless conveyor belt and for repair of one of said conveyor belts the apparatus comprising:
    two heatable press platens;
    a plurality of upper crossbars positioned above said press platens;
    a plurality of lower crossbars positioned below said press platens, said upper and said lower crossbars being combined pairwise;
    a hydraulic press-pressure-producing mechanism supported on said crossbars and comprising a plurality of hydraulic tubes positioned adjacent one another and each having a constant circumference, said tubes being supported on one side thereof against a press plate and on an opposite side against one of said crossbars, said plates each resting on one of said press platens;
    at least one beam extending substantially in a longitudinal direction of said conveyor belt and connected to said upper crossbars;
    at least one vibration motion inducing generator connected to one of said press platens on a protruding portion extending beyond said crossbars;
    a bending line compensator positioned adjacent to said press platen to which said vibration generator is connected maintaining said press platen substantially planar; and
    at least one other vibration generator mounted on said beam.

* * * * *